May 7, 1940.　　　F. TRAVNICEK　　　2,199,682
SPEED REDUCING MECHANISM
Filed Aug. 17, 1938
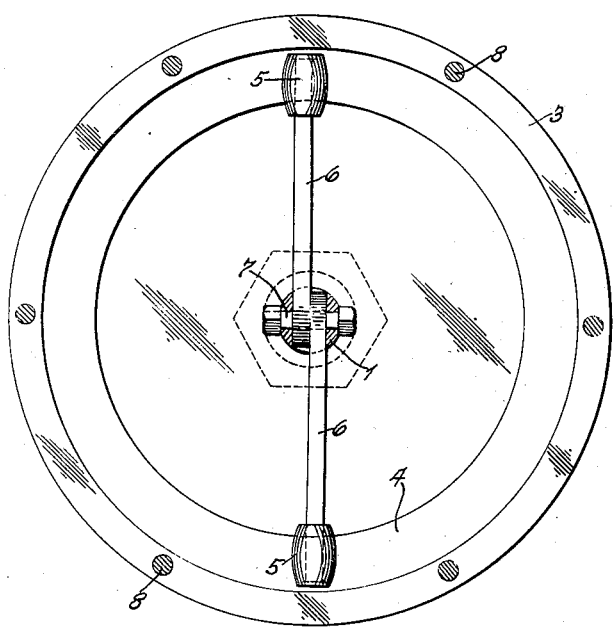
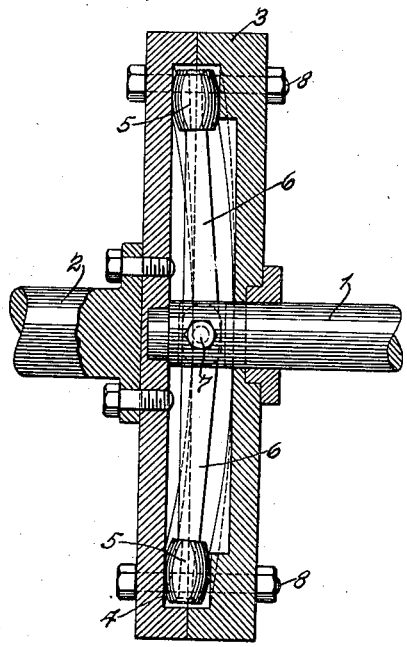
INVENTOR.
FRANK TRAVNICEK
BY Rippey & Cassidy
HIS ATTORNEYS.

Patented May 7, 1940

2,199,682

UNITED STATES PATENT OFFICE 2,199,682

SPEED REDUCING MECHANISM

Frank Travnicek, East St. Louis, Ill.

Application August 17, 1938, Serial No. 225,276

1 Claim. (Cl. 74—63)

This invention relates to speed reducing mechanism.

An object of the invention is to provide novel mechanism for efficiently transmitting power and reducing speed without the use of a positive coupling.

Figs. 1 and 2 illustrate an embodiment of the invention; Fig. 1 being a vertical section through the device transversely of the axis, and Fig. 2 being a cross-section longitudinally of the axis.

In accordance with this invention, a power shaft 1 driven by a prime mover at a high rate of speed is in axial alinement with a shaft 2, to be driven normally at a lower rate of speed. As shown in Figs. 1 and 2, a housing 3 is secured to the driven shaft 2 and has a race or cam-way 4 about the axis of the shafts for rollers 5 or other anti-friction devices secured to impellers 6, which are pivoted by a pin 7 to the power shaft 1.

The race or cam-way 4 is circular with the axis of the shafts 1 and 2 as a center, but departs from a true circle by a variation axially, or out of a plane which is perpendicular to the axis 1.

The race 4 is formed upon the interior surface, as specifically shown in the drawing, of two sections of the housing 3, which are connected together by bolts 8.

The impellers 6 tend to drive the housing 3, and thereby the shaft 2, through their momentum, the rollers 5 being in engagement with the race which is a part of the housing. The race departs but slightly, preferably less than five degrees, from a plane which is perpendicular to the axis of the shaft 1 and passing through the center of the pivot 7. By such an arrangement, friction is reduced to a minimum and the driving action is almost entirely due to the momentum of the impellers. As the shaft 1 is rotated at a high speed, the impellers 6 are rotated with them and tend to take a position perpendicular to the axis of the shaft. Thus, as the rollers 5 strike the inclined surfaces of the race, a force is exerted and the momentum of the impellers tends to rotate the housing and with it the shaft 2.

Various changes may be made in the details of construction within the scope of the appended claim without departing from the spirit of this invention.

I claim:

A speed reducing mechanism including a power shaft, a driven shaft in alinement with the power shaft, a race secured to the driven shaft about the axis of the shafts providing an endless path departing from a circle having said axis as a center by a variation axially, and an impeller hinged to the power shaft and driven thereby and having its outer end or periphery following said race.

FRANK TRAVNICEK.